(12) United States Patent
Nakamura et al.

(10) Patent No.: US 7,424,202 B2
(45) Date of Patent: Sep. 9, 2008

(54) EDITING SYSTEM AND CONTROL METHOD USING A READOUT REQUEST

(75) Inventors: Nobuo Nakamura, Kanagawa (JP); Fumio Shimizu, Kanagawa (JP); Hideaki Miyauchi, Tokyo (JP); Takeshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 821 days.

(21) Appl. No.: 10/900,873

(22) Filed: Jul. 27, 2004

(65) Prior Publication Data

US 2005/0058430 A1     Mar. 17, 2005

(30) Foreign Application Priority Data

Jul. 29, 2003  (JP)  ............................. 2003-282002
Jul. 29, 2003  (JP)  ............................. 2003-282003

(51) Int. Cl.
*H04N 5/262* (2006.01)
(52) U.S. Cl. ......................................... 386/55; 386/64
(58) Field of Classification Search ................. 386/55, 386/52, 64, 4; 711/137, 113; 348/578, 584; 369/47.13; 715/723
See application file for complete search history.

(56) References Cited

U.S. PATENT DOCUMENTS 5,568,275 A * 10/1996 Norton et al. ................. 386/52
6,092,154 A *  7/2000 Curtis et al. ................ 711/137
6,201,924 B1 * 3/2001 Crane et al. .................... 386/52

FOREIGN PATENT DOCUMENTS

GB       2283360 A  *  5/1995
JP       2003-37804     2/2003

* cited by examiner

*Primary Examiner*—David E Harvey
(74) *Attorney, Agent, or Firm*—Frommer Lawrence & Haug LLP; William S. Frommer; Thomas F. Presson

(57) ABSTRACT

An editing system and a control method for improving efficiency of editing work. The editing system is provided with a server for storing the video data of edit material. A memory stores the video data read from the server, the memory having accessibility faster than the server. An editing terminal for reading, processing, and editing required video data from the memory based on an edit list stored in a selected file. When opening the selected file, the editing terminal makes the server read the video data required for creating the edited video based on the edit list being stored in the file and makes the memory store and keep the video data.

6 Claims, 13 Drawing Sheets

EDITING SYSTEM AND CONTROL METHOD USING A READOUT REQUEST

BACKGROUND OF THE INVENTION

1. Field of the Invention

This invention relates to an editing system and control method thereof and, more particularly, is suitably applied to an on-air system which is used in a television broadcasting station, for example.

2. Description of the Related Art

With an editing device which is used in an on-air system, we can create an edit list specifying edit details describing which clip and which clip are to be connected to create edited video and audio while visually confirming the video of desired video/audio material (hereinafter, referred to as clip). Then by editing and processing the video/audio data of specified clips based on the created edit list, edited video/audio based on the edit list can be created (for example, Japanese Patent Application Laid-Open No. 11-66816).

Generally, we create an edit list by processing and editing high-resolution video/audio data, which is used for broadcasting, with an editing device while confirming the obtained edited video and audio.

At this time, the editing device reads required video/audio data from an Audio/Video (AV) server of a large capacity storing various clips obtained by coverage and then processes and edits the data based on the edit list.

However, it takes a long time to read and transfer video/audio data from the AV server to the editing device because of a large amount of the high-resolution video/audio data. Therefore, we have to wait for display or output of edited video and audio after entering a playback command of the edited video and audio to the editing device, resulting in decreasing efficiency of editing work.

As a technique offered by the applicant of this invention to solve this problem, a buffer of a large capacity comprising, for example, a semiconductor memory is provided between an editing device and an AV server. In creating an edit list, required video/audio data is automatically read and stored from the AV server into the buffer according to the progress of the creation work of the edit list. And in response to a playback command of edited video and audio, the video/audio data being stored in the buffer is edited and processed based on the edit list, thereby displaying and outputting the edited video and audio immediately.

Even with this technique, however, in a case where an editing device continues the creation work of an edit list created by another editing device, video/audio data required for obtaining edited video and audio based on the edit list is not stored in a buffer. Therefore, this technique has a similar problem to the conventional case where the editing device needs a long time to take in the required video/audio data from the AV server via the buffer when displaying and outputting the edited video and audio based on the edit list.

SUMMARY OF THE INVENTION

In view of the foregoing, an object of this invention is to provide an editing system and control method thereof capable of significantly improving efficiency of editing work.

The foregoing object and other objects of the invention have been achieved by the provision of an editing system comprising: a first storage and retaining means for storing and retaining the video data of edit material; a second storage and retaining means for storing and keeping the video data of the edit material read from the first storage and retaining means, the second storage and retaining means having accessibility faster than the first storage and retaining means; an editing means for reading, processing and editing required video data from the second storage and retaining means based on the edit list stored in a file selected, in order to create edited video based on the edit list; and a control means for controlling the first and second storage and retaining means. When the file selected is opened, the editing means sends the control means a readout request of video data required for creation of the edited video based on the edit list stored in the file. Then the control means controls the first and second storage and retaining means according to the readout request so that the first storage and retaining means reads the video data and the second storage and retaining means stores and keeps the video data.

Therefore, in this editing system, even the file selected was created by another editing means, the editing means can create the edited video based on the edit list stored in the file, thus making it possible to realize an editing system capable of significantly improving efficiency of editing work.

Further, this invention provides a control method of an editing system comprising: a first step of storing and keeping the video data of edit material in a first storage and retaining means; a second step of storing and keeping the video data read from the first storage and retaining means, in a second storage and retaining means having accessibility faster than the first storage and retaining means; and a third step of, in an editing means, reading, processing and editing required video data from the second storage and retaining means based on the edit list stored in a file selected, in order to create edited video based on the edit list. When the file selected is opened, in the third step, the editing means makes the first storage and retaining means read video data required for creation of the edited video based on the edit list stored in the file and makes the second storage and retaining means store and keep the video data.

Therefore, with this control method of an editing system, even the file selected was created by another editing means, the editing means can create the edited video based on the edit list stored in the file immediately, thus making it possible to realize a control method of an editing system capable of significantly improving efficiency of editing work.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Construction of On-air System According to this Embodiment

Figure 1:
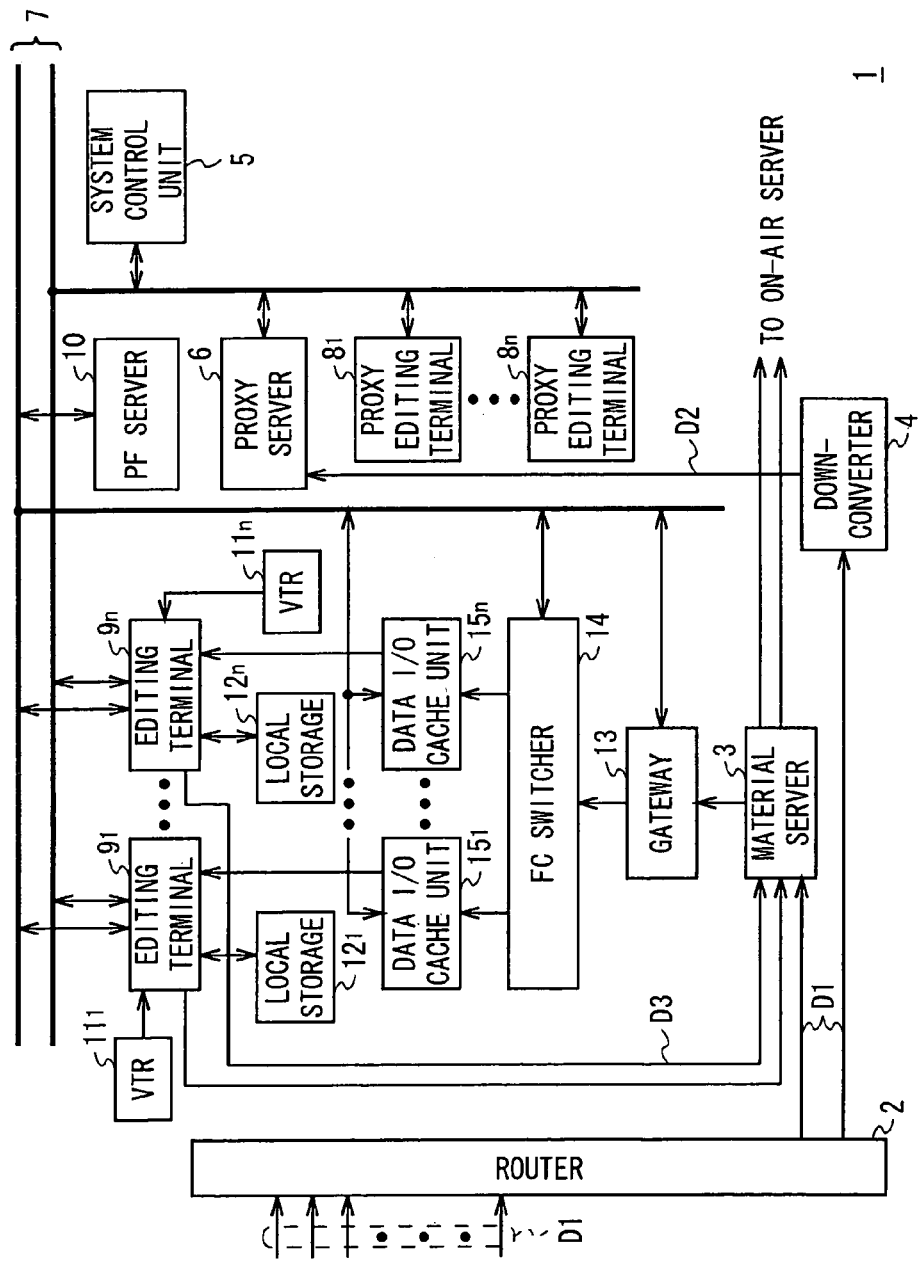
FIG. 1 is a block diagram showing an entire construction of an on-air system according to this invention.

Referring to FIG. 1, reference numeral 1 shows an on-air system of this embodiment which is installed in a television broadcasting station or the like. Video/audio data (hereinafter, referred to as high-resolution video/audio data) D1 of resolution of 140 Mbps in an HDCAM (trademark of Sony Corporation) format is entered to a material server 3 and a down-converter 4 via a router 2, the video/audio data D1 being transferred from a coverage site via a satellite communication circuit and the like or being reproduced from a coverage tape by a video tape recorder.

The material server 3 comprises an AV server of a large capacity composed of a plurality of Redundant Arrays of Independent Disks (RAID), and stores a series of high-resolution video/audio data D1 received via the router 2, in a form of a file under the control of a system control unit 5 comprising a personal computer.

The down-converter 4, on the other hand, converts the received high-resolution video/audio data D1 down to data of resolution of about 8 Mbps, compresses and encodes the resultant with the Motion Picture Experts Group (MPEG) format, and sends the obtained low-resolution video/audio data D2 to a proxy server 6.

Similarly to the material server 3, the proxy server 6 comprises an AV server composed of a plurality of RAIDs, and stores a series of low-resolution video/audio data D2 received from the down-converter 4, in a form of a file under the control of the system control unit 5. In this way, this on-air system 1 records in the proxy server 6 low-resolution clips having the same contents as clips recorded in the material server 3.

Then the low-resolution video/audio data D2 of clips being stored in the proxy server 6 can be read by using proxy editing terminal devices $8_1$ to $8_n$ and editing terminal devices $9_1$ to $9_n$ being connected to the proxy server 6 via an Ethernet (trademark) 7. Then by using this data D2, the proxy editing terminal devices $8_1$ to $8_n$ and the editing terminal devices $9_1$ to $9_n$ can create edit lists specifying edit details for only cut editing in which desired clips out of clips being stored in the material server 3 are to be connected in what order to create processed and edited video and audio (hereinafter, edited video and audio).

In actual, in an edit list creation mode realized by running software dedicated to the edit list creation, when an operator selects one clip out of the clips being stored in the proxy server 6 and enters its playback command, a proxy editing terminal device $8_1$ to $8_n$ accesses the system control unit 5 via the Ethernet 7 and controls the proxy server 6 via the system control unit 5 so as to make the proxy server 6 read the low-resolution video/audio data D2 of the clip.

The proxy editing terminal device $8_1$ to $8_n$ decodes the low-resolution video/audio data D2 read from the proxy server 6, and displays video based on the video/audio data of thus obtained baseband on a display. As a result, the operator can create an edit list for only cut editing while visually confirming the video being displayed on the display. Note that such edit list for only cut editing is referred to as an Edit Decision List (EDL) hereinafter.

The edit list data which is the data of thus created edit list can be transferred to a desired editing terminal device $9_1$ to $9_n$ via the Ethernet 7 from the proxy editing terminal device $8_1$ to $8_n$ according to operator's operation. The transferred edit list data is stored and managed by this editing terminal device $9_1$ to $9_n$ thereafter.

On the other hand the editing terminal devices $9_1$ to $9_n$ each comprises a nonlinear editing device with a video board capable of applying special effects to high-resolution video/audio data D1 in real time. In an edit list creation mode realized by running dedicated software, when the operator selects one clip out of clips being stored in the proxy server 6 and enters its playback command, the editing terminal device $9_1$ to $9_n$ controls the proxy server 6 via the system control unit 5, so as to display the low-resolution video of the clip on the display, as in the case of the proxy editing terminal devices $8_1$ to $8_n$.

Thus, while visually confirming this video, the operator can create a final edit list including setting of video special effects and audio mixing, newly or by using an edit list created with a proxy editing terminal device $8_1$ to $8_n$.

Note that vide tape recorders $11_1$ to $11_n$ and local storage units $12_1$ to $12_n$ such as hard disk drives are connected to the editing terminal devices $9_1$ to $9_n$, respectively, so that video/audio material being recorded on video tapes or the like can be taken in the local storage units $12_1$ to $12_n$ as clips via the video tape recorders $11_1$ to $11_n$ and used for editing.

In addition, during the creation of an edit list, every time when a desired video/audio part in one clip is arranged on a time line by specifying an IN-point and an OUT-point, the editing terminal device $9_1$ to $9_n$ accesses the system control unit 5 via the Ethernet 7 and controls the material server 3 via the system control unit 5, so as to sequentially read the high-resolution video/audio data D1 of the video/audio part being arranged on the time line.

Then this high-resolution video/audio data D1 is converted into a prescribed format via a gateway 13 under the control of the system control unit 5, and then is given and stored via a fiber channel switcher 14 in a corresponding data I/O cache unit $15_1$ to $15_n$ which comprises, for example, a semiconductor memory of a storage capacity of 180 Giga bytes.

When the operator enters a playback (preview) command for the high-resolution video based on the edit list thereafter, the editing terminal device $9_1$ to $9_n$ reads the required high-resolution video/audio data D1 from the corresponding data I/O cache unit $15_1$ to $15_n$, to create and display edited video by using the high-resolution video/audio data D1 on the display.

When the operator finishes to create the edit list and enters a command to execute this edit list, the editing terminal device $9_1$ to $9_n$ sequentially reads the corresponding high-resolution video/audio data D1 from the data I/O cache unit $15_1$ to $15_n$ according to the edit list, applies, if required, special effects and audio mixing to the high-resolution video/audio data D1, and sends thus obtained edited video/audio data D3 to the material server 3. As a result, this edited video/audio data D3 is recorded in the material server 3 in a form of a file under the control of the system control unit 5.

Further, the edited video/audio data D3 recorded in this material server 3 is transferred to an on-air server not shown, according to operator's operation, and is read from the on-air server according to a so-called play list which is created by a program producer of broadcasting.

As described above, with this on-air system 1, a procedure from editing to on-air of edited video/audio obtained by editing can be efficiently performed.

(2) Construction of Editing Terminal Device $9_1$ to $9_n$

Figure 2:
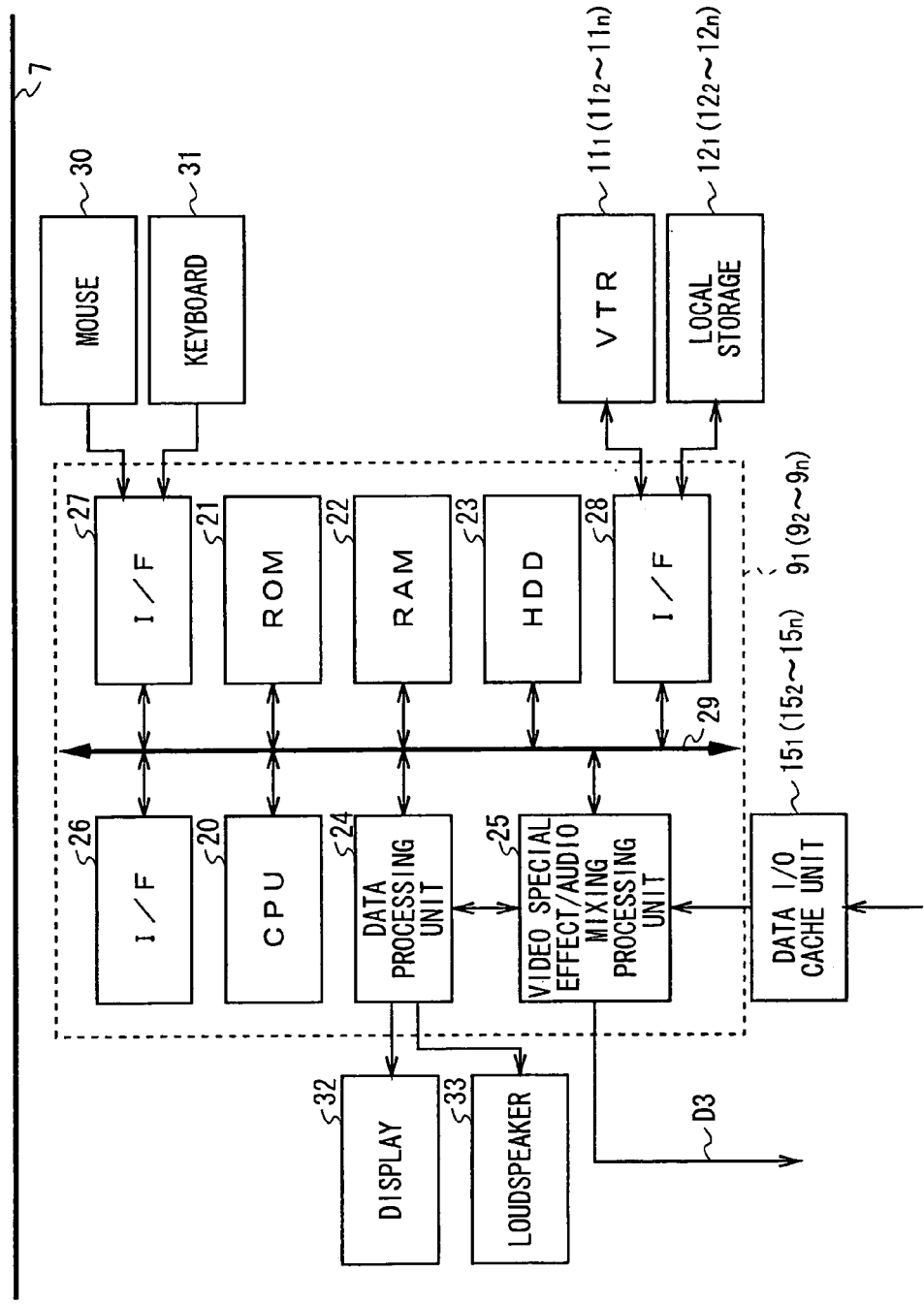
FIG. 2 is a block diagram showing a construction of an editing terminal device.

Referring to FIG. 2, the editing terminal devices $9_1$ to $9_n$ are each composed of a central processing unit (CPU) 20, a Read Only Memory (ROM) 21, a Random Access Memory (RAM) 22, a hard disk drive 23 storing various software, a data processing unit 24 with various video data processing functions and audio data processing functions, a video special effect/audio mixing processing unit 25 for applying specified video special effects and audio mixing to high-resolution video/audio data D1, and various interfaces 26 to 28, which are connected with a CPU bus 29, and is connected to the Ethernet 7 via the interface 26.

In addition, input devices such as a mouse 30 and a keyboard 31 are connected to the interface 27, and a video tape recorder $11_1$ to $11_n$ and a local storage unit $12_1$ to $12_n$ are connected to the interface 28. Connected to the data processing unit 24 are a display 32 and a loudspeaker 33.

The CPU 20 reads screen data from the hard disk drive 23, according to necessity, and gives it to the data processing unit 24, thereby displaying various windows and dialogs on the display, which will be described later.

In addition, the CPU 20 sends a command to the system control unit 5 (FIG. 1) via the interface 26 and the Ethernet 7 according to necessity, so as to control the material server 3 (FIG. 1), the proxy server 6 (FIG. 1), the FC switcher 14 (FIG. 1), and the data I/O cache units $15_1$ to $15_n$ (FIG. 1) via the system control unit 5 to make them be in desired states.

As a result, for example, the CPU 20 takes in the low-resolution video/audio data D2 of a clip specified by the operator via the interface 26, which is transferred from the proxy server 6 via the Ethernet 7, and gives this to the data processing unit 24, thereby displaying the video based on the low-resolution video/audio data D2 at a prescribed position on a corresponding window or dialog.

Further, the CPU 20 controls the video special effect/audio mixing processing unit 25 according to necessity, so as to make this unit 25 read specified high-resolution video/audio data D1 from the data I/O cache unit $15_1$ to $15_n$ and apply special effects and audio mixing to the high-resolution video/audio data D1 according to necessity.

Thus obtained edited video/audio data D3 is given to the data processing unit 24, thereby displaying on the display 32 the edited video, which has been subjected to the special effects, and outputting from the loudspeaker 33 the edited audio, which has been subjected to the audio mixing, on the basis of the edited video/audio data D3.

Further, the CPU 20 controls the video special effect/audio mixing processing unit 25 according to necessity, to send the edited video/audio data D3 to the material server 3, and controls the material server 3 via the system control unit 5 to store therein this edited video/audio data D3, resulting in registering the edited video/audio data D3 in the material server 3.

(3) Edit List Creation Procedure in Editing Terminal Devices $9_1$ to $9_n$

The edit list creation procedure in the editing terminal devices $9_1$ to $9_n$ will be next described.

We create an edit list with an editing terminal device $9_1$ to $9_n$ by specifying desired video/audio parts of desired clips being recorded in the material server 3, setting a sending order of cut video by arranging these parts on a time line, and applying video special effects and audio mixing and inserting a title.

Information (EDL information) on thus created edit list, such as the time codes of IN-point and OUT-point of each cut, the order of the cuts, the name of the edit list, the creator and creation date and time, information on the video special effects and audio mixing set in this edit list, and various information on working environments at a time of creating the edit list are stored in one file and managed as "project".

Therefore, a new project should be created when a new edit list is created. In this case, the operator runs corresponding software to display a project manager window 40 shown in FIG. 3 on the display 32 (FIG. 2).

This project manager window 40 is a window for managing and viewing projects, and is composed of a tree display part 41, a clip display part 42, and a project list display part 43.

The tree display part 41 of the project manger window 40 shows the storage locations of the files of projects (hereinafter, referred to as project files) in a form of a tree, the project files existing in the editing terminal device $9_1$ to $9_n$ and in the project file server 10 which manages all project files as described later.

The clip display part 42 lists thumbnail images of clips belonging to a project being selected in the tree display part 41 as icons (hereinafter, referred to as clip icons) 44. The project list display part 43 lists management information such as a storage drive name, a project name, and update date and time, for each project being displayed in the tree display part 41.

Figure 4:
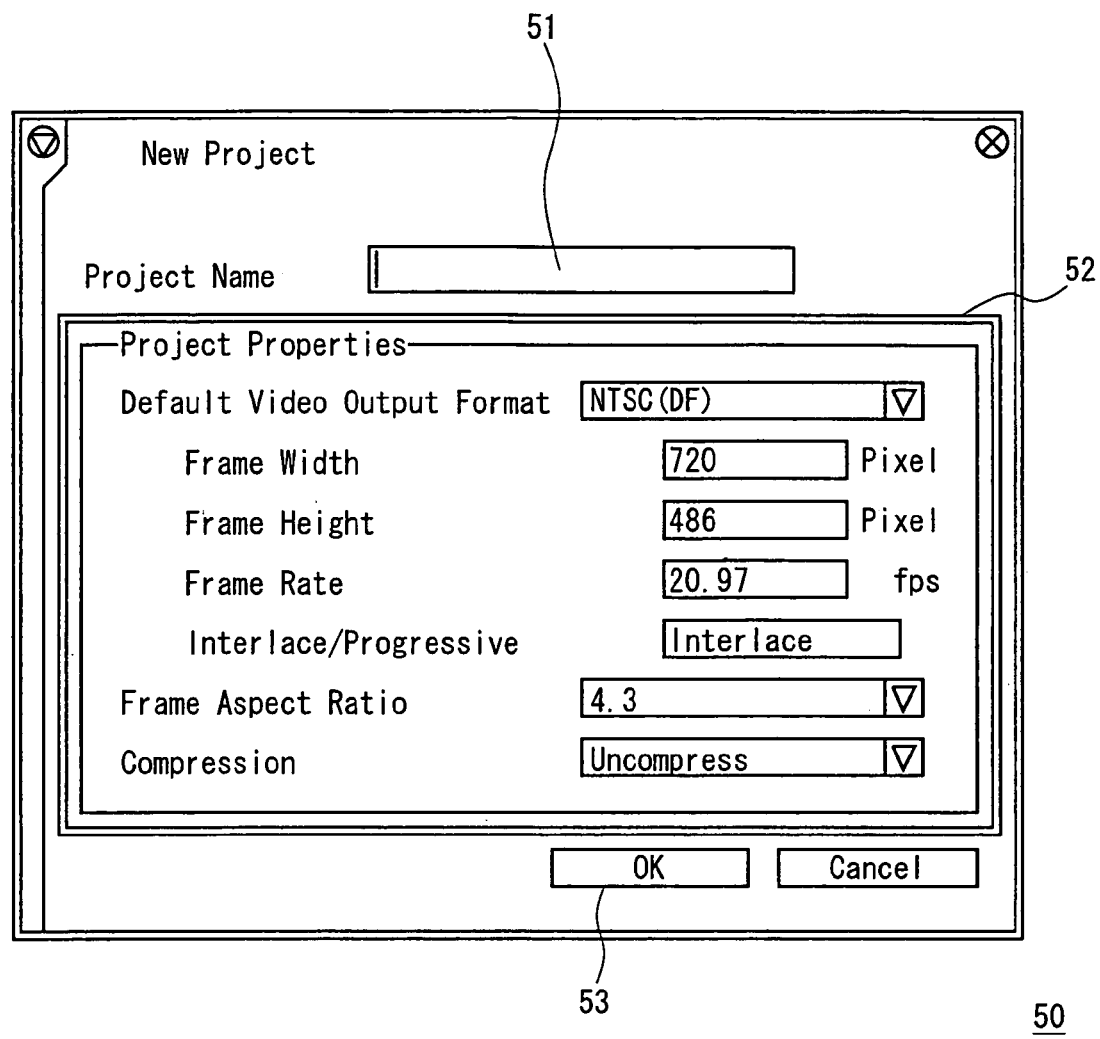
FIG. 4 shows a new project dialog.

In a case of creating a new project, the operator clicks a new creation button 45A of a button group 45 locating at the upper part of the project manager window 40, to display a new project dialog 50 shown in FIG. 4. Then the operator enters a desired project name in a project name input box 51 of the new project dialog 50, sets various attributes regarding this project in an attribute setting part 52, and then clicks an OK button 53.

Figure 3:
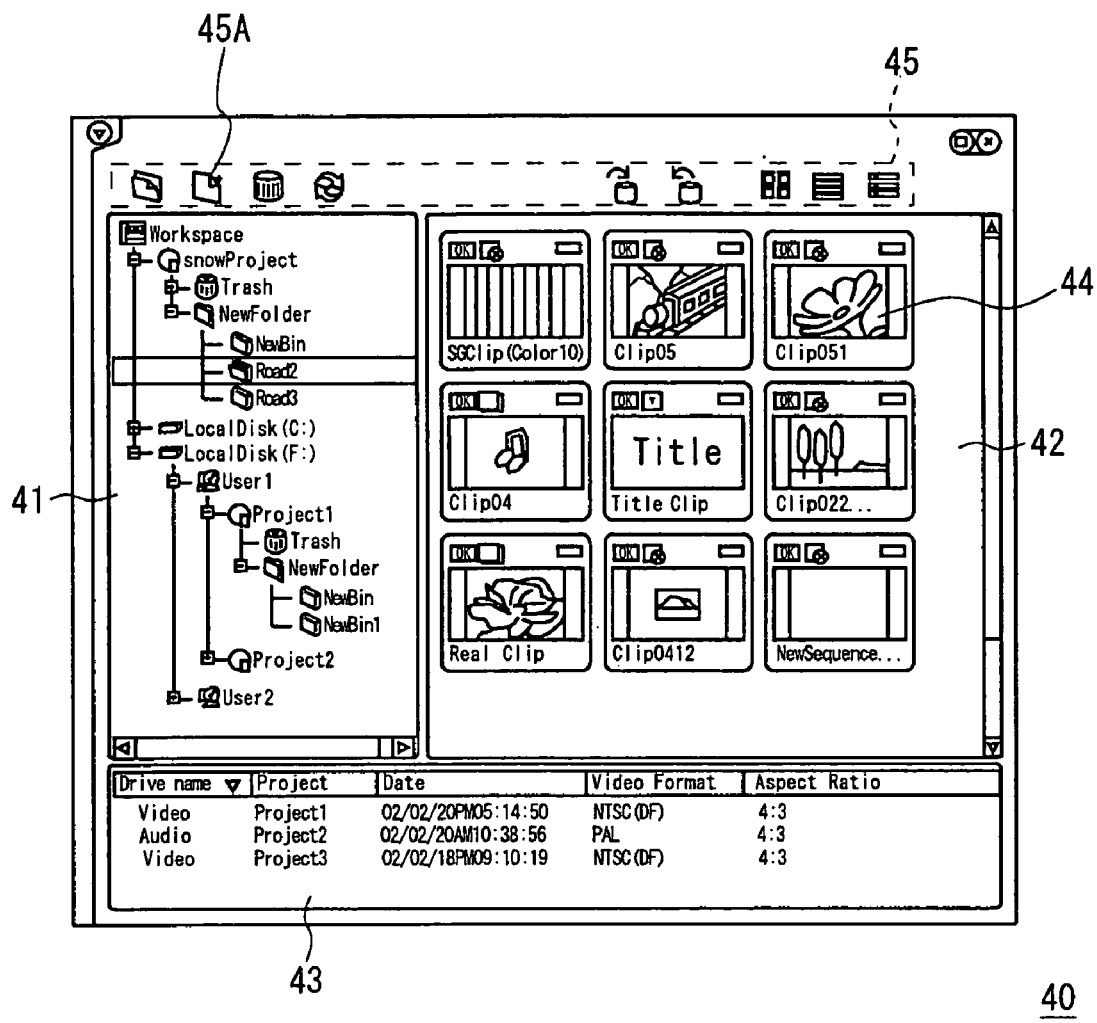
FIG. 3 shows a project manager window.

As a result, the new project is newly registered in the editing terminal device $9_1$ to $9_n$ and the project file server 10, and a new folder and bin are automatically created in this project. This result is reflected in the tree display part 41 and the project list display part 43 of the project manager window 40 (FIG. 3).

Figure 5:
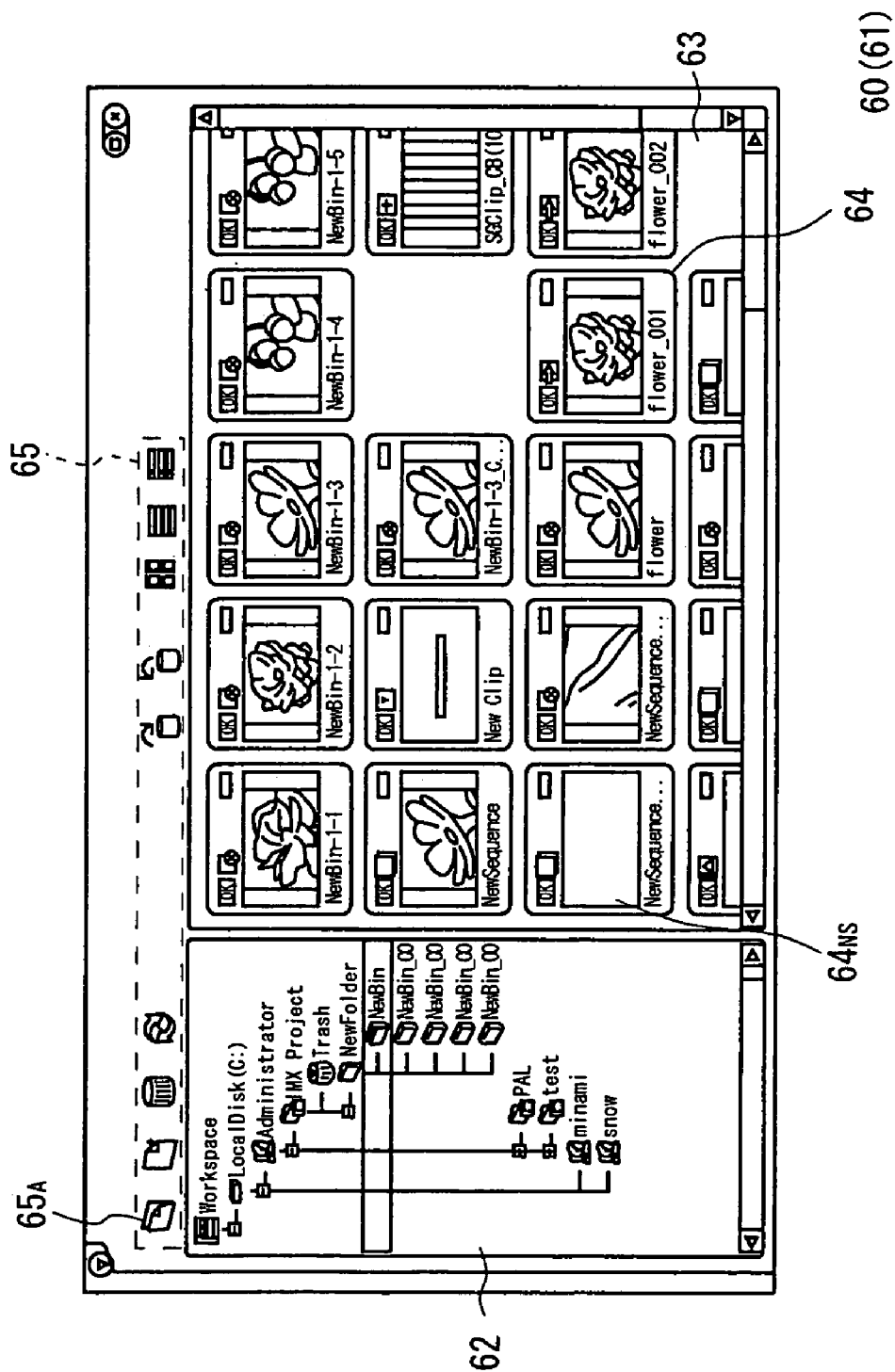
FIG. 5 shows a clip explorer window.

At this time, the display 32 (FIG. 2) displays a clip explorer window 60 shown in FIG. 5 and a server site explorer window 61 having the same structure.

The clip explorer window 60 is a window for displaying and managing clips belonging to a project being open, and is composed of a tree display part 62 and a clip display part 63.

The tree display part 62 of the clip explorer window 60 shows all projects and their contents (folders, bins) existing in the system in a form of a tree. The clip display part 63 lists clip icons 64 for all clips belonging to a bin being selected in the tree display part 62. Since clips belonging to a new project do not exist in the initial state just after the new project is created, no clip icon 64 exists in the clip display part 63 of the clip explorer window 60.

The server site explorer window 61 is a window to lists clips being recorded in the material server 3 and the proxy server 6, and is composed of a tree display part 62 and a clip display part 63, similarly to the clip explorer window 60.

The tree display part 62 of the server site explorer window 61 shows all folders, files and so on existing in the material server 3 and the proxy server 6 in a form of a tree. The clip display part 63 shows the clip icons 64 for all clips being stored in a folder or the like being selected in the tree display part 62.

Figure 6:
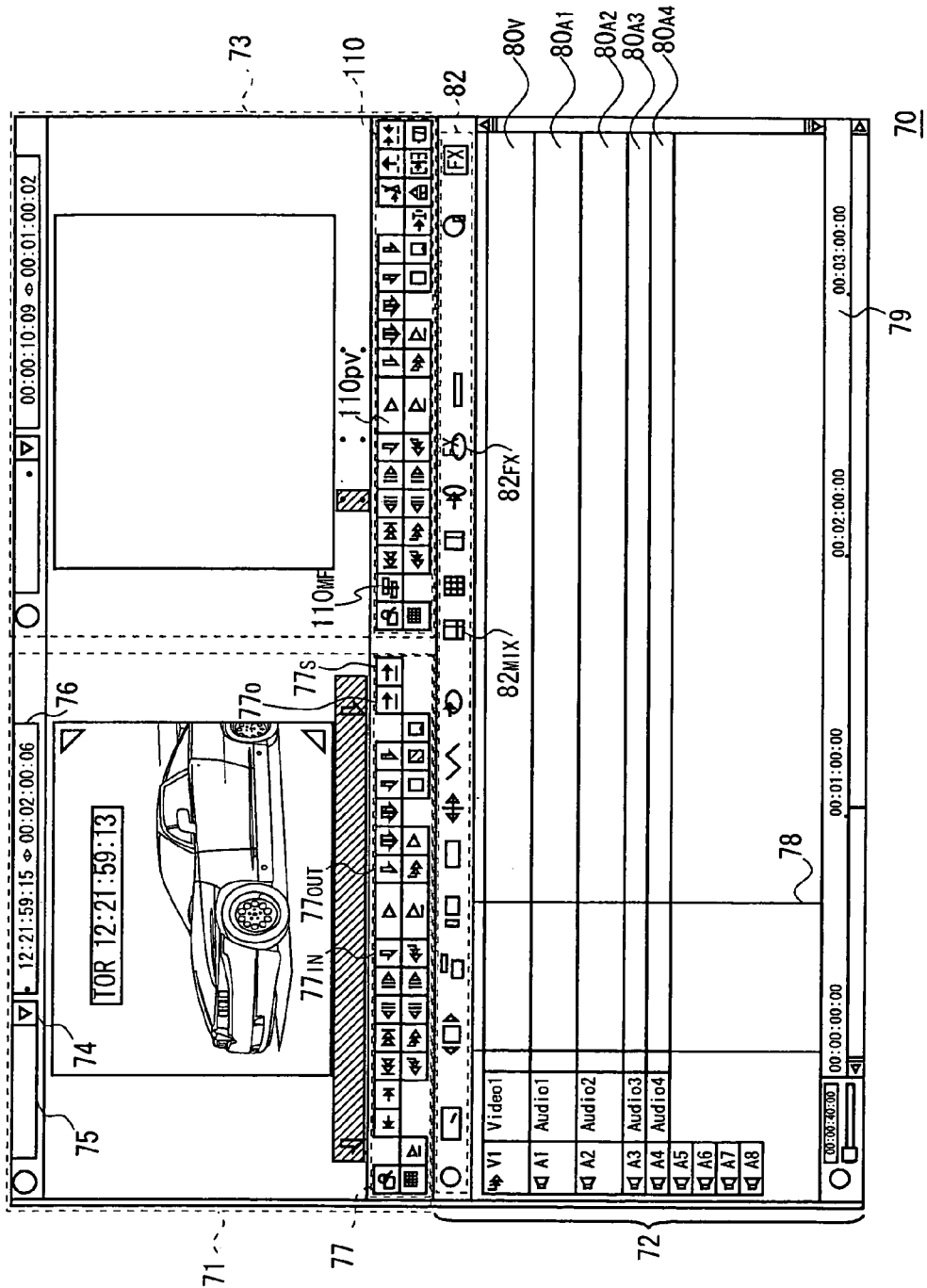
FIGS. 6 to 8 show time line editor windows.

In a case where the operator desires to create a new edit list, he/she clicks a new sequence creation button 65A of a button group 65 locating at the upper part of the clip explorer window 60 after creating the new project as described above. As a result, a clip icon $64_{NS}$ for this edit list appears in the clip display part 63 of the clip explorer window 60 and a time line editor window 70 shown in FIG. 6 appears on the display 32 (FIG. 2).

The time line editor window 70 is composed of a source viewer part 71 for extracting a desired part as a cut while visually confirming the video of a clip, a time line part 72 for setting edit details indicating how to arrange extracted cuts and which special effects are applied to the connecting parts of the cuts, and a master viewer part 73 for confirming the edit details set in the time line part 72, by using high-resolution video.

To select a clip to be edited, the operator moves the clip icon 64 of a desired clip out of the clip icons 64 (FIG. 5) being displayed in the clip display part 63 of the server site explorer window 61 (FIG. 5) onto the source viewer part 71 of the time line editor window 70 by drug and drop. By repeating this action, plural clips can be selected.

With the time line editor window 70, the operator can display a menu listing clips selected as described above, by clicking a clip select menu display button 74 locating at the upper part of the source viewer part 71. Further, he/she can select a desired clip in this menu as a clip to be edited.

For example, the video of the beginning frame of a clip being selected is displayed in the source viewer part 71, the name of this clip is shown in a clip list box 75, and the time code of this frame being displayed in the source viewer part 71 and the material length of this clip are shown in a time code display part 76.

With the time line editor window 70, the operator can playback video of a clip being selected to be edited, with low-resolution video/audio data D2 (FIG. 1), which has been recorded in the proxy server 6 (FIG. 1), at a normal speed, frame by frame, or backwards frame by frame, by clicking a desired command button of the command button group 77 locating at the lower part of the source viewer part 71.

In actual, when a command button for normal playback, frame playback, or frame backward playback of the command button group 77 is clicked, the CPU 20 (FIG. 2) controls the proxy server 6 via the system control part 5 (FIG. 1) accordingly. Thereby the low-resolution video/audio data D2 of the specified clip is read in the playback mode corresponding to the command button clicked. As a result, the low-resolution video based on the low-resolution video/audio data D2 is played back in the source viewer part 71 at a normal speed, frame by frame, or backwards frame by frame.

Thus while visually confirming the video of the clip being played back in the source viewer part 71, the operator can specify a start point (IN-point) and an end point (OUT-point) by clicking a mark-in button $77_{IN}$ and a mark-out button $77_{OUT}$ of the command button group 77, thereby extracting a desired video/audio part as a cut from the clip.

In addition, the operator can create an edit list in the following manner by using video/audio parts specified as cuts as described above.

First the operator specifies a video/audio part of a clip as a cut as described above, then moves a play line 78 being displayed in the time line part 72 to a desired position with the mouse with a time scale 79 locating at the lower part of the time line part 72 as an index, and clicks an overwrite button $77_o$ or a splice IN button $77_S$ of the command button group 77 locating at the lower part of the source viewer part 71.

Figure 7:
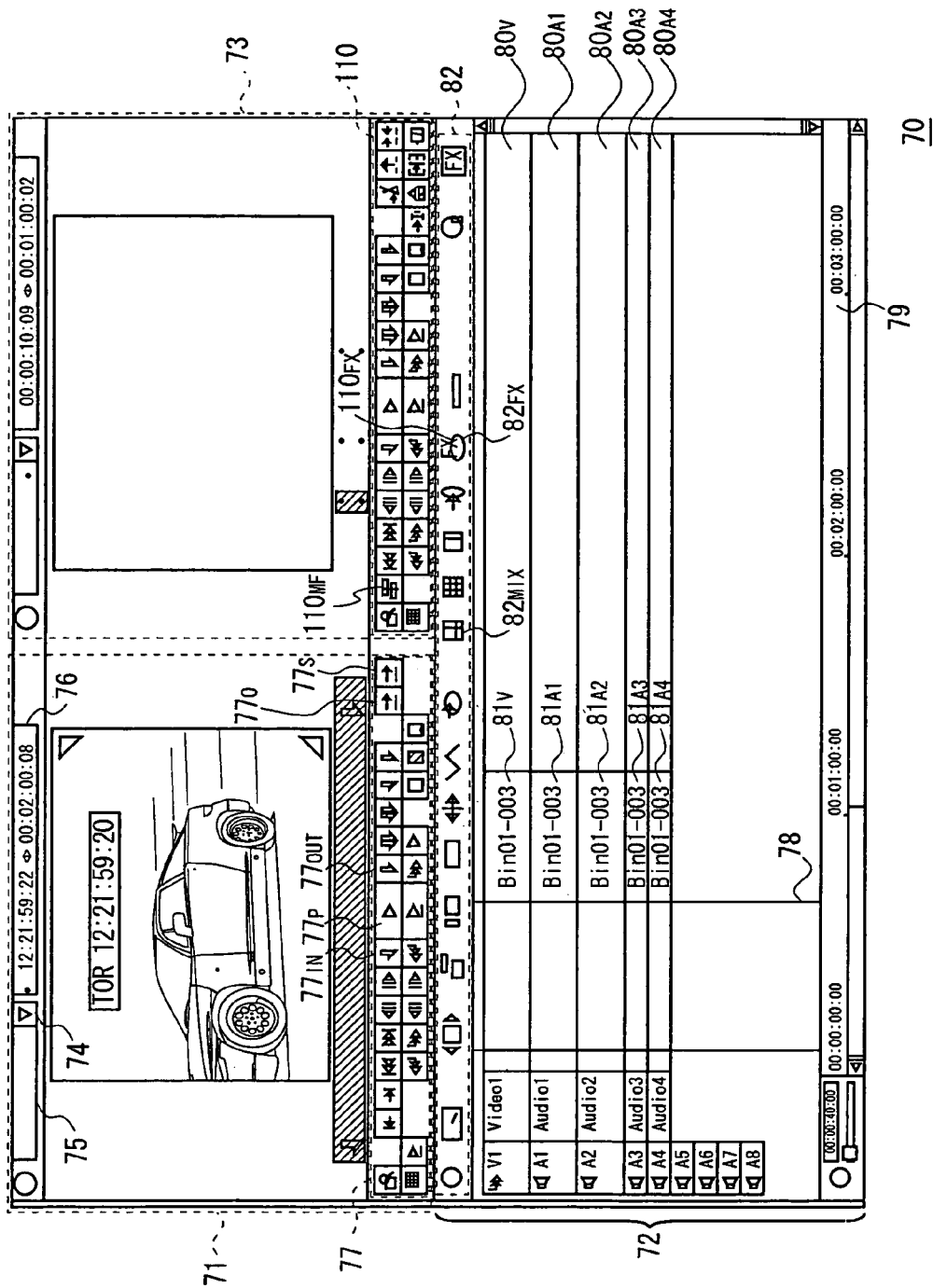

As a result, as shown in FIG. 7, by overwriting when the overwrite button $77_o$ is clicked or by inserting when the splice IN button $77_S$ is clicked, a colored area $81_V$ having the material length of the video/audio part is arranged with its beginning position placed on the play line 78 on the video track $80_V$ of the time line part 72.

In a case where audio is accompanied with the video/audio part, colored areas $81_{A1}$ to $81_{A4}$ having the same length as the colored area $81_V$ of the video track $80_V$ are arranged with their beginning positions placed on the play line 78 on the audio tracks $80_{A1}$ to $80_{A4}$ equal to the number of channels out of a plurality of the audio tracks $80_{A1}$ to $80_{A4}$ provided under the video track $80_V$.

At this time, the CPU 20 sends the system control unit 5 a command according to operator's operation. As a result, under the control of the system control unit 5, the high-resolution video/audio data D1 of the video/audio part of the corresponding clip is read from the material server 3 (FIG. 1), with margins of several seconds on the IN-point side and the OUT-point side. This data is then given and stored in the data I/O cache unit $15_1$ to $15_n$ corresponding to the editing terminal device $9_1$ to $9_n$ via the gateway 13 (FIG. 1) and FC switcher 14 (FIG. 1).

When the operator desires to add audio to the video/audio part, he/she clicks the clip select menu display button 74 to select a desired clip for this audio from the menu being displayed, moves the play line 78 of the time line part 72 to a desired position, and clicks the above-described overwrite button $77_o$ or splice IN button $77_S$ after specifying a desired audio track $80_{A1}$ to $80_{A4}$.

As a result, a colored area $81_{A1}$ to $81_{A4}$ having the material length of this clip is displayed with its beginning position placed on the play line 78 on the audio track $80_{A1}$ to $80_{A4}$ specified. And in a case where this clip has been recorded in the material server 3, its audio data is read from the material server 3 and stored in the data I/O cache unit $15_1$ to $15_n$.

Figure 8:
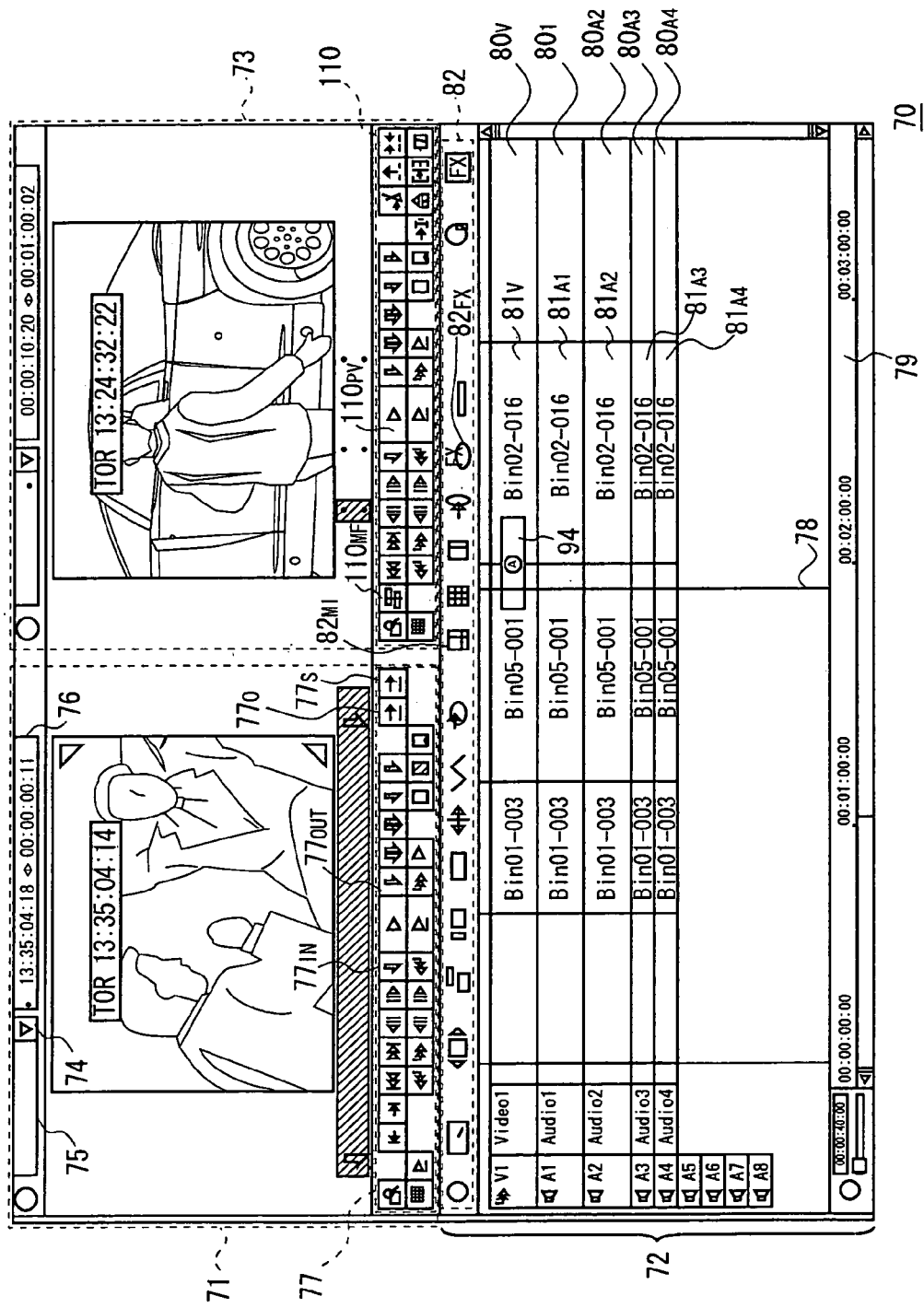

Then the operator repeats operation as described above, including specifying a video/audio part as a cut (determining a cut) and pasting the video/audio part to the time line part 72 (displaying colored areas $81_V$, $81_{A1}$ to $81_{A4}$ on the video track $80_V$ and/or audio tracks $80_{A1}$ to $80_{A4}$), thereby sequentially displaying the colored areas $81_V$, $81_{A1}$ to $81_{A4}$ on the video track $80_V$ and the audio tracks $80_{A1}$ to $80_{A4}$ so as to continue on the time scale 79 for a desired period of time from the beginning ("00:00.00:00") of the time scale 79 as shown in FIG. 8.

Displaying the colored areas $81_V$, $81_{A1}$ to $81_{A4}$ on the video track $80_V$ and the audio tracks $80_{A1}$ to $80_{A4}$ in the time line part 72 means that edited video/audio are displayed/output based on the video/audio parts corresponding to the colored areas $81_V$, $81_{A1}$ to $81_{A4}$ in accordance with the time scale 79. Therefore, an edit list specifying the order and contents of video/audio to be displayed/output as edited video/audio can be created.

The numbers of video tracks $80_V$ and audio tracks $80_{A1}$ to $80_{A4}$ to be displayed in the time line part 72 can be set as desired. In a case where cuts or clips are pasted to plural video tracks $80_V$ and audio tracks $80_{A1}$ to $80_{A4}$ provided, edited video is created by superimposing video at the same position on the time scale 79 of the video tracks $80_V$, and edited audio is created by synthesizing audio at the same position on the time scale 79 of the audio tracks $80_{A1}$ to $80_{A4}$.

In creating an edit list as described above, when the operator desires to apply special effects to the connecting part of first cut video and second cut video, he/she can set the desired video special effects in the following manner.

Figure 9:
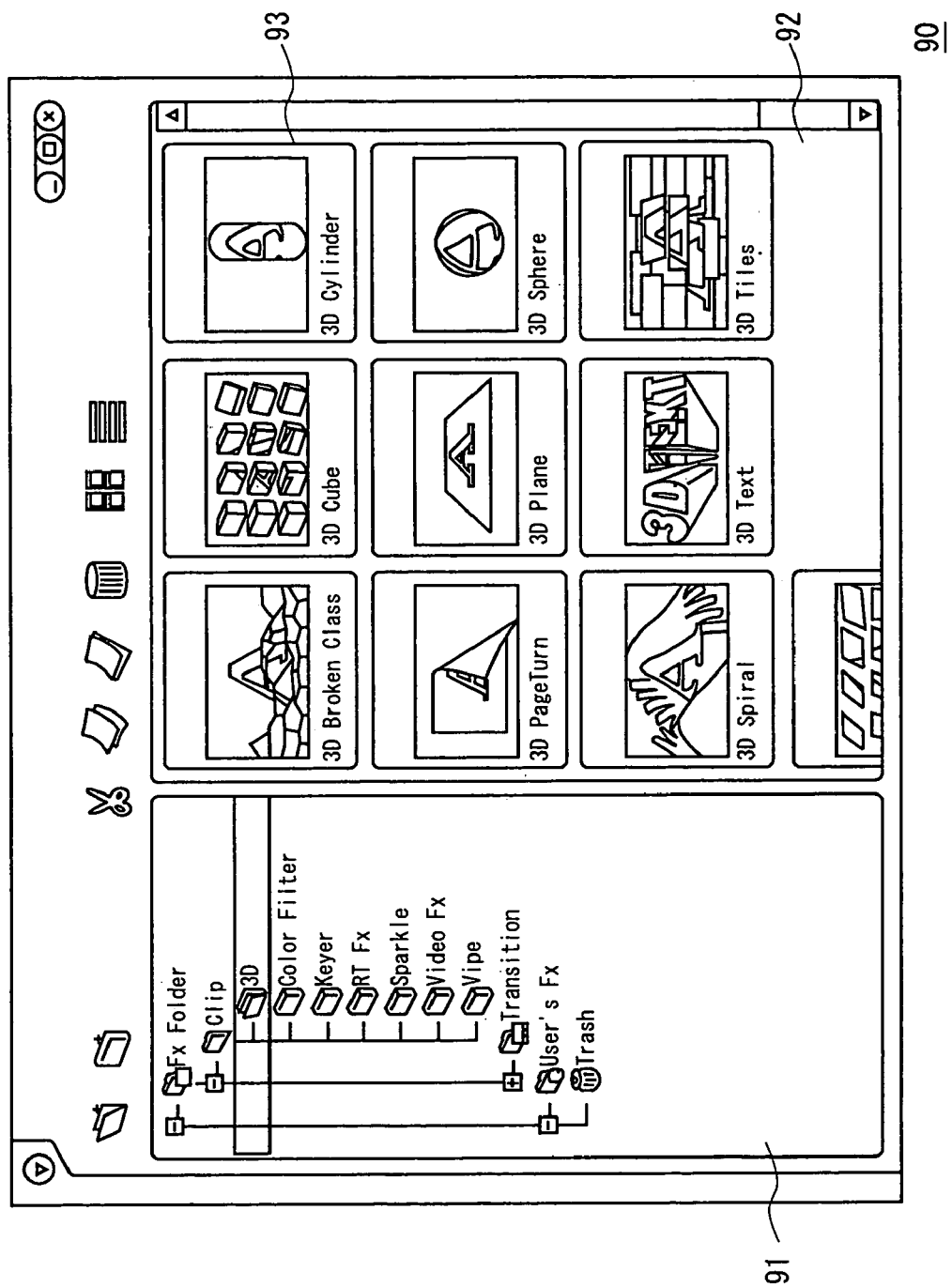
FIG. 9 shows an FX explorer window.

First the preceding first cut and the next second cut are pasted to the video track $80_V$ so as to continue on the time scale 79, and then an FX explorer button $82_{FX}$ is clicked out of the button group 82 locating at the upper part of the time line part 72. As a result, an FX explorer window 90 as shown in FIG. 9 appears on the display 32 (FIG. 2).

This FX explorer window 90 is composed of a tree display part 91 and an icon display part 92. The tree display part 91 displays various kinds of video special effects which can be applied by the editing terminal device $9_1$ to $9_n$. The icon display part 92 shows images subjected to the video special effects, in a form of icons.

Next the operator pastes the special effect icon 93 for a desired video special effect out of the icons (hereinafter, referred to as special effect icons) 93 being displayed in the icon display part 92 of the FX explorer window 90, to the connecting part of the first and second cuts in the video track $80_V$ of the time line editor window 70 by drug and drop.

As a result, at the time of creating edited video, the video special effect corresponding to the special effect icon, which has been pasted to the video track $80_V$ as described above, is applied to the connecting part of the first cut video to the second cut video.

In a case where a special effect icon 93 is pasted to the video track $80_V$ of the time line editor window 70, a mark 94 corresponding to the special effect icon 93 is displayed at the pasting position as shown in FIG. 8.

In addition, when the operator desires to apply audio mixing to the audio of a cut or a clip pasted to an audio track $80_{A1}$ to $80_{A4}$, the desired audio mixing can be set in the following manner.

First the operator moves the play line 78 being displayed in the time line part 72 of the time line editor window 70, to the colored area $81_{A1}$ to $81_{A4}$ corresponding to a desired cut or clip, out of the cuts or clips pasted to the audio tracks $80_{A1}$ to $80_{A4}$, and then clicks an audio mixer button $82_{MIX}$ of the button group 82 locating at the upper part of the time line part 72.

Figure 10:
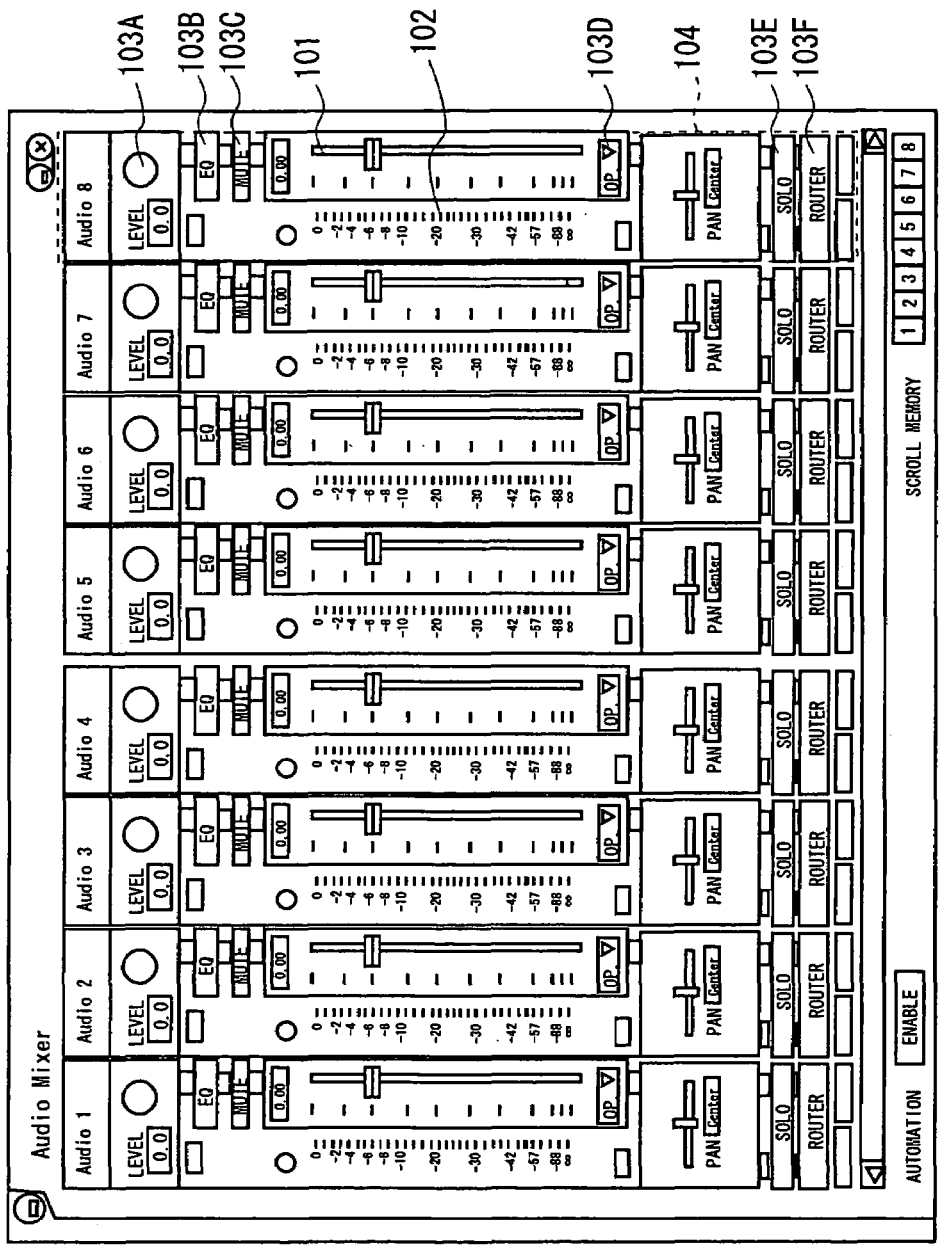
FIG. 10 shows an audio mixing window.

Thereby, as shown in FIG. 10, an audio mixer window 100 appears, in which a plurality of mixing parts 104 each having a volume 101, a level meter 102 and various setting buttons 103A to 103F are provided in correspondence with the audio tracks $80_{A1}$ to $80_{A4}$ of the time line part 72 of the time line editor window 70.

Then the operator operates the volume 101 and the setting buttons 103A to 103F corresponding to a desired audio track $80_{A1}$ to $80_{A4}$ of the time line part 72 of the time line editor window 70 while visually confirming the level meter 102, the volume 101 and setting buttons 103A to 103F on the audio mixer window 100.

As a result, at a time of playback of the video/audio parts pasted to the audio tracks $80_{A1}$ to $80_{A4}$, the audio mixing, which has been set as described above, is applied.

Further, with the time line editor window 70, the operator moves the play line 78 of the time line part 72 to a desired position with the mouse after or while creating an edit list as described above, and clicks a preview button $110_{PV}$ of a command button group 110 locating at the lower part of a master viewer part 73, thereby playing back the high-resolution edited video in the master viewer part 73 at a normal speed from the video/audio part corresponding to the play line 78.

In actual, when the preview button $110_{PV}$ is clicked, the CPU 20 controls the video special effect/audio mixing processing unit 25 (FIG. 2) to read the high-resolution video/audio data D1 of the required video/audio parts from the data I/O cache unit $15_1$ to $15_n$ and to apply video special effects and audio mixing to the high-resolution video/audio data D1 according to necessity.

As a result, the high-resolution edited video/audio data D3 subjected to the video special effects and the audio mixing is created and given to the data processing unit 24 (FIG. 2), thereby displaying and outputting edited video and audio based on the edited video/audio data D3 in the master viewer part 73 of the time line editor window 70 and from the loudspeaker 33 (FIG. 2).

As described above, the operator can create an edit list while occasionally viewing and confirming edit details based on the edited video being displayed in the master viewer part 73 of the time line editor window 70 or can confirm the contents of the created edit list.

After creating the edit list as described above, the operator moves the clip icon $64_{NS}$ corresponding to the edit list being displayed in the clip display part 63 of the clip explorer window 60 (FIG. 5) onto the clip display part 63 of the server site explorer window 61 (FIG. 5) by drug and drop, thereby registering the editing result based on the edit list in the material server 3 (FIG. 1).

In actual, the CPU 20 controls the video special effect/audio mixing processing unit 25 (FIG. 2) based on the created edit list to create edited video/audio data D3 of edited video and audio based on the edit list by using high-resolution video/audio data D1 being stored in the data I/O cache unit $15_1$ to $15_n$ and sends it to the material server 3. As a result, this edited video/audio data D3 is registered in the material server 3 by being stored in a file of the above-described sequence clip.

In addition, the data of this edit list is given to the material server 3 via the system control unit 5 to be stored in the file of the sequence clip, and the data of a project file regarding the edit list is given to the project file server 10 via the Ethernet 7 so as to update the data of the corresponding project file being stored and managed by the project file server 10.

As described above, with an editing terminal device $9_1$ to $9_n$, the operator can create a desired edit list by using the time line editor window 70 and further, create edited video and audio based on the edit list and register them in the material server 3.

Note that in the case of this on-air system 1, the operator selects the project of an edit list being displayed in the tree display part 41 of the project manager window 40 (FIG. 3) after or while creating the edit list on the time line editor window 70, and selects "send" out of a list which appears by clicking the right button of the mouse 30 (FIG. 2), thereby transferring this project file to the project file server 10 (FIG. 1) via the Ethernet 7. As a result the data of the corresponding project file being stored and managed by the project file server 10 can be updated.

As described above, in this on-air system 1, project files created with the editing terminal devices $9_1$ to $9_n$ are all managed by the project file server 10, so that an operator can use any editing terminal device $9_1$ to $9_n$ to view or continue to create the project files. That is, the project files can be shared in an entire system.

(4) Automatic Loading Function at a Time of Opening Project File

An automatic loading function at a time of opening a project file, which is installed in the on-air system 1 will be now described.

As described with reference to FIG. 1, this on-air system 1 is provided with the data I/O cache units $15_1$ to $15_n$ each comprising a semiconductor memory which has accessibility faster than the material server 3 (that is, high-resolution video/audio data D1 can be read or written faster), between the material server 3 and the editing terminal devices $9_1$ to $9_n$. When a video/audio part extracted from a clip is pasted to the time line part 72 of the time line editor window 70 as described above with reference to FIG. 6 to FIG. 8, the high-resolution video/audio data D1 of the video/audio part is read from the material server 3 and is stored and kept in the corresponding data I/O cache unit $15_1$ to $15_n$, so as to display and output edited video and audio of the video/audio part based on the high-resolution video/audio data D1 immediately.

In a case where an editing terminal device $9_1$ to $9_n$ is used to continue to create a project file which was created with another-editing terminal device $9_1$ to $9_n$ and has been stored in the project file server 10, the high-resolution video/audio data D1 of each video/audio part used in the edit list is not stored in the data I/O cache unit $15_1$ to $15_n$ corresponding to the edit terminal device $9_1$ to $9_n$. Therefore, just after resuming the creation work of this edit list, the high-resolution edited video and audio cannot be viewed based on the edit list.

To avoid this problem, an automatic loading function is installed in this on-air system 1 to immediately and automatically read and store the high-resolution video/audio data D1 of each video/audio part used in the edit list of a project from the material server 3, in the corresponding data I/O cache unit $15_1$ to $15_n$, when an editing terminal device $9_1$ to $9_n$ reads and opens the project file created by another editing terminal device $9_1$ to $9_n$, from the project file server 10.

In actual, when the operator specifies one project file on the tree display part 41 of the project manager window 40 as described above with reference to FIG. 3 and enters a command to open this file, the editing terminal device $9_1$ to $9_n$ sends a transfer request of the project file to the project file server 10. Then the editing terminal device $9_1$ to $9_n$ opens the received project file and displays the time line editor window 70 (FIG. 6 to FIG. 8) according to the edit list being stored in the project file on the display 32 (FIG. 2).

In addition, the editing terminal device $9_1$ to $9_n$ sends the system control unit 5 a transfer request of a list (hereinafter, referred to as retained clip list) of the high-resolution vide/audio data D1 of clips being stored and kept by the corresponding data I/O cache unit $15_1$ to $15_n$. At this time, the system control unit 5 manages all clips being recorded or stored and kept in the material server 3, the proxy server 6, the data I/O cache units $15_1$ to $15_n$, and sends the list to the editing terminal device $9_1$ to $9_n$ in response to the received transfer request.

The editing terminal device $9_1$ to $9_n$ determines based on the retained clip list received from the system control unit 5 and the EDL information included in the project file whether there are clips which are used in the edit list but are not stored and kept in the corresponding data I/O cache unit $15_1$ to $15_n$.

When there are clips which are used in the edit list of the project but are not stored in the corresponding data I/O cache unit $15_1$ to $15_n$, the editing terminal device $9_1$ to $9_n$ sends a readout request of the clips to the system control unit 5.

The system control unit 5 controls the material server 3 according to the received readout request, to read the high-resolution video/audio data D12 of each clip requested. As a result, the high-resolution video/audio data D1 is given to, and is stored and kept in the corresponding data I/O cache unit $15_1$ to $15_n$ via the gateway 13 and the FC switcher 14 in order.

Then, when the operator enters a playback command by clicking a playback button $90_{PV}$ (FIG. 6 to FIG. 8) of the command button group 90 locating at the lower part of the master viewer window 73 of the time line editor window 70 (FIG. 6 to FIG. 8) being displayed, the editing terminal device $9_1$ to $9_n$ reads the corresponding high-resolution video/audio data D1 from the data I/O cache unit $15_1$ to $15_n$, and displays video based on the high-resolution video/audio data D1 in the master viewer part 73. As a result, the operator can view high-resolution edited video and audio based on the edit list.

In this embodiment, when the editing terminal device $9_1$ to $9_n$ sends the system control unit 5 a readout request of high-resolution video/audio data D1 of clips which are used in the edit list of a project but are not stored in the corresponding data IO cache unit $15_1$ to $15_n$, high-resolution video/audio data D1 around the edited points of each video/audio part is preferentially transferred.

Figure 11:
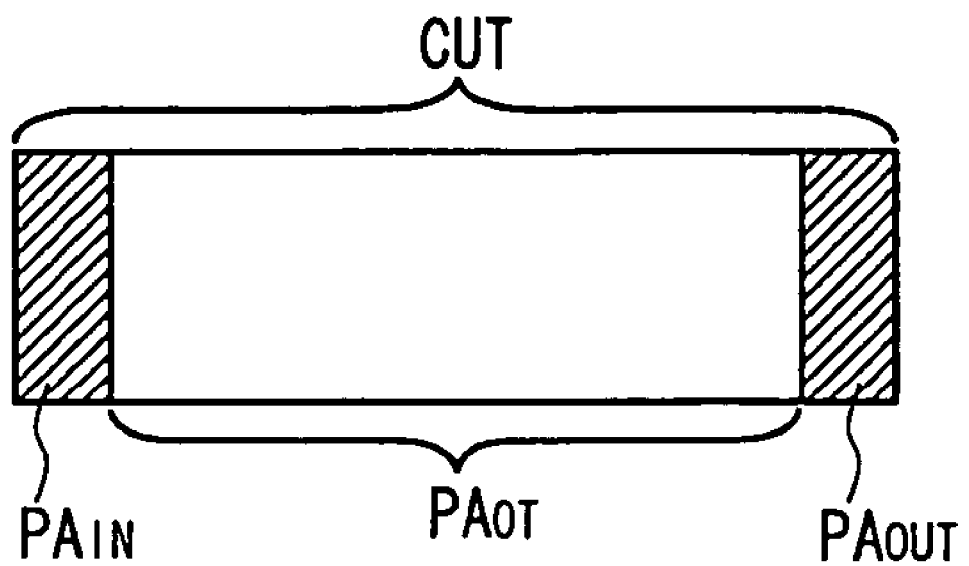
FIG. 11 is a conceptual view explaining how to read high-resolution video/audio data D1 of each video/audio part which is used in an edit list.

Specifically, when the editing terminal device $9_1$ to $9_n$ sends a readout request to the system control unit 5, it first sends a readout request of high-resolution video/audio data D1 for video/audio parts $PA_{IN}$ and $PA_{OUT}$ of video/audio parts (cuts) CUT for preset several seconds (for example, for two to ten seconds) on an IN-point side and an OUT-point side, to the system control unit 5, and then sends a readout request of high-resolution video/audio data D1 for the remaining parts $PA_{OT}$ of the video/audio parts CUT, as shown in FIG. 11.

As a result, under the control of the system control unit 5 according to the readout request, the high-resolution video/audio data D1 of the video/audio parts $PA_{IN}$ and $PA_{OUT}$ for several seconds on the IN-point side and the OUT-point side of each video/audio part CUT and then the high-resolution video/audio data D1 of the remaining part $PA_{OT}$ of the video/audio part CUT are read from the material server 3 and is stored and kept in the corresponding data I/O cache unit $15_1$ to $15_n$.

As described above, in this on-air system 1, when an editing terminal device $9_1$ to $9_n$ opens a project file created by another editing terminal device $9_1$ to $9_n$, it preferentially loads the high-resolution video/audio data D1 of the connecting parts of cuts, which are often previewed in the edit list creation work, in the data I/O cache unit $15_1$ to $15_n$.

(5) Project File Opening Procedure

Figure 12:
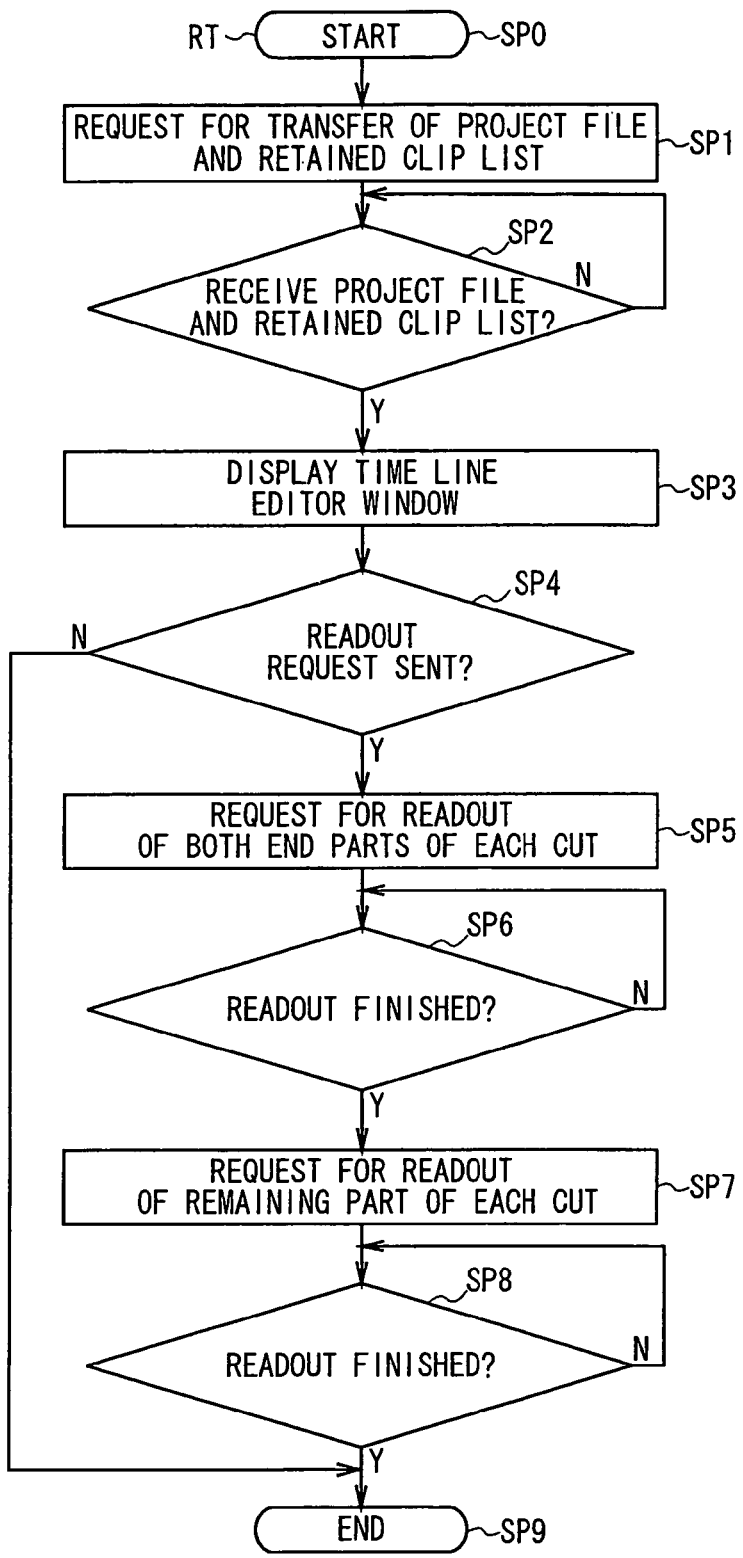
FIG. 12 is a flowchart for a project file opening procedure.

Various processes regarding the above automatic loading function of the editing terminal devices $9_1$ to $9_n$ are performed under a project file opening procedure RT shown in FIG. 12 under the control of the CPU 20 FIG. 2).

In actual, when the operator specifies one project file in the tree display part 41 of the project manager window 40 and enters a command to open this file, the CPU 20 starts this project file opening procedure RT from step SP0. At next step SP1, the CPU 20 sends a transfer request of the project file to the project file server 10 and also sends a transfer request of a retained clip list which is a list of high-resolution video/audio data D1 of clips being stored and kept in the corresponding data I/O cache unit $15_1$ to $15_n$, to the system control unit 5.

Then the CPU 20 goes on to step SP2 to wait for the project file and the retained clip list. Upon reception of the data of the project file and the retained clip list, the CPU 20 goes on to step SP3 to give the data of the project file to the data processing unit 24 (FIG. 2), thereby displaying the time line editor window 70 (FIG. 6 to FIG. 8) based on the edit list stored in the project file on the display 32 (FIG. 2).

Then the CPU 20 goes on to step SP4 to determine based on the retained clip list and the EDL information included in the project file whether there are clips which are used in the edit list but are not stored and kept in the corresponding data I/O cache unit $15_1$ to $15_n$.

When there are no such clips, the CPU 20 goes on to step SP9 to end this project file opening procedure RT. When there are such clips, on the contrary, the CPU 20 goes on to step SP5 to send the system control unit 5 a readout request of the high-resolution video/audio data D1 of the video/audio parts $PA_{IN}$ and $PA_{OUT}$ (FIG. 11) for several seconds on the IN-point side and the OUT-point side of the video audio parts CUT (FIG. 11) of the clips. Then the CPU 20 goes on to step SP6 to wait for the readout of the high-resolution video/audio data D1.

When the CPU 20 confirms based on a notification from the system control unit 5 that the readout of the high-resolution video/audio data D1 has been completed, the CPU 20 goes on to step SP7 to sends a readout request of the remaining parts $PA_{OT}$ (FIG. 11) of the video/audio parts CUT to the system control 5. Then the CPU 20 goes on to step SP8 to wait for the readout of the high-resolution video/audio data D1.

When the CPU 20 confirms based on a notification received from the system control unit 5 that the readout of the high-resolution video/audio data D1 has been completed, the CPU 20 goes on to step SP9 to finish this project file opening procedure RT.

(6) Operation and Effects of This Embodiment

According to the above configuration of the on-air system 1, when a project file is read from the project file server 10 and is opened, the time line editor window 70 according to the edit list stored in the project file appears on the display 32 of the editing terminal device $9_1$ to $9_n$. In addition, the high resolution video/audio data D1 of clips which are used in this edit list of this project but are not stored and kept in the corresponding data I/O cache unit $15_1$ to $15_n$ is immediately and automatically read from the material server 3 and is stored and kept in the data I/O cache unit $15_1$ to $15_n$.

Therefore, in this on-air system 1, even when an editing terminal device $9_1$ to $9_n$ opens a project file created with another editing terminal device $9_1$ to $9_n$, the editing terminal device $9_1$ to $9_n$ can display and output edited video and audio based on the edit list in a short time, with the result that the editing terminal device $9_1$ to $9_n$ can reduce time to load the high-resolution video/audio data D1.

Further, in this case, in this on-air system 1, when the high-resolution video/audio data D1 of each video/audio part used in the edit list is loaded in the corresponding data I/O cache unit $15_1$ to $15_n$, the high-resolution video/audio data D1 of video/audio parts $PA_{IN}$ and $PA_{OUT}$ for several seconds on the IN-point side and the OUT-point side, which is often viewed in the video/audio part, is first loaded, and then the remaining part $PA_{OT}$ of the video/audio part is loaded, resulting in further reducing the time to load the data.

According to the above configuration, when an editing terminal device $9_1$ to $9_n$ opens a project file created with another editing terminal device $9_1$ to $9_n$, the high-resolution video/audio data D1 of clips which are used in the edit list stored in the project file but are not stored and kept in the corresponding data I/O cache unit $15_1$ to $15_n$ is immediately and automatically read from the material server 3 and is stored and kept in the data I/O cache unit $15_1$ to $15_n$. As a result, the operator can view high-resolution edited video and audio based on the edit list in a short time after the project file is opened, thus significantly improving efficiency of editing work.

(7) Match Frame Function

A match frame function installed in the editing terminal devices $9_1$ to $9_n$ will be now described.

Such a function (hereinafter, referred to as match frame function) is installed in each editing terminal device $9_1$ to $9_n$ that, by specifying a desired position of a video/audio part pasted to the video track $80_V$ of the time lie part 72 while an edit list is created on the time line editor window 70 as described above with reference to FIG. 6 to FIG. 8, the low-resolution video of the position is displayed in the source viewer part 71 in a state usable for the successive creation work of the edit list.

In actual, when the operator moves the play line 78 to a desired position on a desired colored area $81_V$ being displayed in the video track $80_V$ of the time line part 72 of the time line editor window 70 and then clicks a match frame button $110_{MF}$ of the command button group 110 locating at the lower part of the master viewer part 73, the editing terminal device $9_1$ to $9_n$ displays the low-resolution frame video of the clip of the colored area $81_V$ corresponding to the position of the play line 78, in the source viewer part 71.

In addition, the name of the clip specified is shown in the clip list box 75 of the source viewer part 71 and the time code of the frame video of the clip is shown in the time code display part 76.

Then by clicking a playback button $77_P$ of the command button group 77 locating at the lower part of the source viewer part 71, the video of this clip is played back in the source viewer part 71 at a normal speed, frame by frame, or backwards frame by frame.

Thus the operator can extract a video/audio part of a desired length from, for example, a frame next to the frame video, as a cut by setting its IN-point and OUT-point while visually confirming the video of the clip being played back in the source viewer part 71, and past this to the video track $80_V$ of the time line part 72 so as to follow the colored area $81_V$ which was used for searching for the match frame, thereby easily creating an edit list specifying match frame editing.

(8) Processes Regarding Match Frame Function of CPU 20

Figure 13:
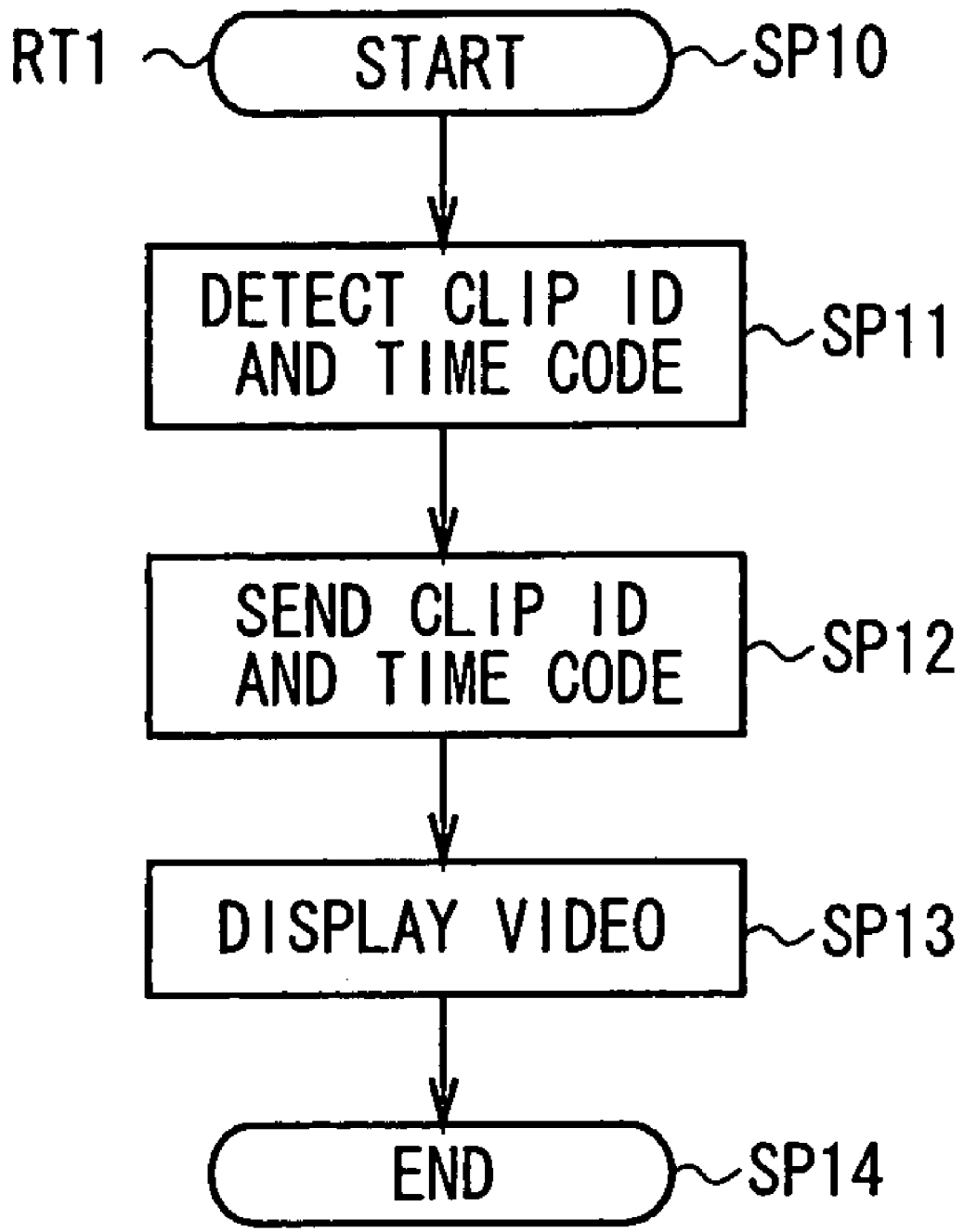
FIG. 13 is a flowchart for a match frame processing procedure.

The above match frame function is realized with a match frame processing procedure RT1 shown in FIG. 13 under the control of the CPU 20.

In actual, when the operator enters a searching command of a desired video/audio part of a desired clip by clicking the match frame button $110_{MF}$ of the master viewer part 71 on the time line editor window 70, the CPU 20 starts this match frame processing procedure RT1 from step SP10. At step SP11, the CPU 20 detects the clip ID of the clip corresponding to the colored area $81_V$ of the video track $80_V$ being displayed with the play line 78 of the time line part 72 and the time code of the play line 78 of the clip.

Then the CPU 20 moves to step SP12 to notify the system control unit 5 via the Ethernet 7 of the clip ID and the time code of the clip detected at step SP11, together with a command.

At this time, the system control unit 5 searches for the corresponding clip, based on the received clip ID and management information (clip name, recorded date and time, video format, material length and clip ID) on each clip being recorded in the material server 3 and proxy server 6 managed by the own unit, and controls the proxy server 6 based on the searching result to make the proxy server 6 read the low-resolution video/audio data D2 of the frame video of the clip specified by the time code. Then the low-resolution video/audio data D2 is given to the editing terminal device $9_1$ to $9_n$ via the Ethernet 7.

At next step SP13, the CPU 20 gives the low-resolution video/audio data D2 read from the proxy server 6, to the data processing unit 24 (FIG. 2) via the interface 26, thereby displaying the frame video based on the low-resolution video/audio data D2 in the source viewer part 71 of the time line editor window 70. Then the CPU 20 moves on to step SP14 to finish this match frame processing procedure RT1.

As described above, the CPU 20 can display a frame video of a clip corresponding to a position of the play line 78 in the source viewer part 71 of the time line editor window 70 in a state usable for the successive creation work of the edit list, the clip being selected in the time line part 72.

(9) Operation and Effects of this Embodiment

According to the above configuration, at a time of creating an edit list with an editing terminal device $9_1$ to $9_n$ in this on-air system 1, the play line 78 is moved to a prescribed position on a desired colored area $81_V$ being displayed on the video track $80_V$ of the time line part 72 of the time line editor window 70 and then the match frame button $110_{MF}$ is clicked. Thereby the low-resolution frame video of the clip specified by the time code of the play line 78 is displayed in the source viewer part 71.

Therefore, in this on-air system 1, the editing terminal device $9_1$ to $9_n$ can find the clip with the match frame function and displays the clip in the source viewer part 71 of the time editor window 70, the clip being shared by the proxy editing terminal devices $8_1$ to $8_n$ and the editing terminal devices $9_1$ to $9_n$ and stored in the proxy server 6. This can simplify the creation work of an edit list including setting of match frame editing.

According to the above configuration, at a time of creating an edit list with an editing terminal device $9_1$ to $9_n$, the play line 78 is moved to a desired position on a desired colored area $81_V$ being displayed on the video track $80_V$ of the time line part 72 of the time line editor window 70. And then when the match frame button $110_{MF}$ is clicked, the low-resolution frame video of the clip specified by the time code of the play line 78 is displayed in the source viewer 71. This can simplify the creation work of an edit list including setting of match frame editing, thus making it possible to significantly improve efficiency of editing work.

(10) Other Embodiments

The above embodiment has described a case where this invention is applied to the on-air system 1 configured as shown in FIG. 1. This invention, however, is not limited to this and can be widely applied to editing systems having other various configurations.

Further, the above embodiment has described a case where edit material to be edited is video/audio material. This invention, however, is not limited to this and can be applied to a case where edit material is video material comprising only video.

Still further, the above embodiment has described a case where the material server 3 serving as a first storage and retaining means for storing and retaining video/audio data of each clip obtained by coverage comprises a plurality of RAIDs. This invention, however, is not limited to this and other constructions can be widely applied to the material server 3.

Still further, the above embodiment has described a case where each data I/O cache unit $15_1$ to $15_n$ serving as a second storage and retaining means for storing and keeping high-resolution video/audio data D1 read from the material server 3 comprises a semiconductor memory. This invention, however, is not limited to this and storage elements other than semiconductor memories can be used, provided that they have faster accessibility than the material server 3.

Still further, the above embodiment has described a case where each edit terminal device $9_1$ to $9_n$ serving as an editing means for creating edited video based on a selected edit list by reading, processing and editing high-resolution video/audio data D1 from a data I/O cache unit $15_1$ to $15_n$ based on the edit list is configured as shown in FIG. 2. This invention, however, is not limited to this and other various configurations can be widely applied.

Still further, the above embodiment has described a case where the system control unit 5 for controlling the entire on-air system 1 is applied as a control means for controlling the material server 3 and the data I/O cache units $15_1$ to $15_n$. This invention, however, is not limited to this and the functions of the system control unit 5 regarding to this invention can be provided in the editing terminal devices $9_1$ to $9_n$.

Still further, the above embodiment has described a case where the high-resolution video/audio data D1 around the edited points of video/audio parts is preferentially read in response to a readout request which is sent from an editing terminal device $9_1$ to $9_n$ to the system control unit 5 when the material server 3 reads the high-resolution video/audio data D1 of the video/audio parts of clips which are used in an edit list which was created with another editing terminal device $9_1$ to $9_n$ and is stored in a project file. This invention, however, is not limited to this and the preferential readout of the high-resolution video/audio data D1 around the edited points of the video/audio parts can be controlled by only the system control unit 5 so that the editing terminal devices $9_1$ to $9_n$ are not involved in this control. Specifically, for example, an editing terminal device $9_1$ to $9_n$ sends a readout request of the video/audio parts of clips used in an edit list, to the system control unit 5, and the system control unit 5 controls the material server 3 so as to preferentially read the high-resolution video/audio data D1 around the edited points of the video/audio parts.

Still further, the above-embodiment has described a case where a readout request of the high-resolution video/audio data D1 of clips which are used in an edit list stored in a project file but are not stored in a corresponding data I/O cache unit $15_1$ to $15_n$ is sent to the system control unit 5 when an editing terminal device $9_1$ to $9_n$ opens the project file. This invention, however, is not limited to this and the editing terminal device $9_1$ to $9_n$ can send the system control unit 5 a readout request of the high-resolution video/audio data D1 of all clips used in an edit list, regardless of whether the corresponding data I/O cache unit $15_1$ to $15_n$ stores the data.

This invention can be applied to various editing systems used in systems other than this.

While there has been described in connection with the preferred embodiments of the invention, it will be obvious to those skilled in the art that various changed and modifications may be aimed, therefore, to cover in the appended claims all such changes and modifications as fall within the true spirit ad scope of the invention.

What is claimed is:

1. An editing system comprising:
   first storage means for storing video data of edit material;
   second storage means for storing the video data of the edit material read from the first storage means, the second storage means having accessibility faster than the first storage means;
   editing means for editing video data, from the second storage means based on an edit list specifying edit details, in order to create edited video based on the edit list, the edit list being stored in a selected file; and
   control means for controlling the first storage means and the second storage means according to requests from the editing means, wherein:
   the editing means, when opening the selected file, provides the control means a transfer request of a list of the video data stored in the second storage means corresponding to the editing means, and based on a retained clip list received from the control means, when there is video data required in the edit list but not stored in the second storage means, provides the control means a readout request of the video data required for creating the edited video based on the edit list being stored in the selected file; and the control means in response to the received transfer request, sends the retained clip list to the editing terminal, and in response to the received readout request, controls the first storage means and the second storage means according to the readout request from the editing means so that the first storage means reads the video data required and the second storage means stores the video data required.

2. The editing system according to claim 1, wherein the editing means, when opening the selected file, gives the control means the readout request of the video data of the edit material which is used in the edit list but is not stored in the second storage means, as the video data required for creating the edited video based on the edit list being stored in the selected file.

3. The editing system according to claim 1, wherein said control means makes the first storage means preferentially read the video data around edited points of the edit material, out of the video data required for creating the edited video.

4. A control method of an editing system, comprising:
a first step of storing video data of edit material in first storage means;
a second step of storing the video data read from the first storage means, in second storage means having accessibility faster than the first storage means; and
a third step of reading, processing, and editing video data required, from the second storage means based on an edit list specifying edit details, in order to create edited video based on the edit list in prescribed editing means, the edit list being stored in a selected file, wherein,
in the third step, the editing means, when opening the selected file, provides the control means a transfer request of a list of the video data stored in the second storage means corresponding to the editing means, and based on a retained clip list received from the control means, when there is video data required in the edit list but not stored in the second storage means, makes the first storage means read the video data required for creating the edited video based on the edit list being stored in the selected file and makes the second storage means store the video data required.

5. The control method according to claim 4, wherein, in the third step, the editing means, when opening the selected file, makes the first storage means read the video data of the edit material which is used in the edit list but is not stored in the second storage means and makes the second storage means store the video data, as the video data required for creating the edited video based on the edit list being stored in the selected file.

6. The control method according to claim 4, wherein, in the third step, the editing means makes the first storage means preferentially read the video data around edited points of the edit material, out of the video data required for creating the edited video.

* * * * *